US009432878B2

(12) United States Patent
Chun et al.

(10) Patent No.: US 9,432,878 B2
(45) Date of Patent: Aug. 30, 2016

(54) METHOD OF GENERATING DATA BLOCK IN WIRELESS COMMUNICATION SYSTEM

(75) Inventors: Sung Duck Chun, Anyang-si (KR); Young Dae Lee, Anyang-si (KR); Sung June Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 12/448,091

(22) PCT Filed: Jan. 10, 2008

(86) PCT No.: PCT/KR2008/000149
§ 371 (c)(1),
(2), (4) Date: Jun. 8, 2009

(87) PCT Pub. No.: WO2008/084992
PCT Pub. Date: Jul. 17, 2008

(65) Prior Publication Data
US 2010/0014446 A1   Jan. 21, 2010

Related U.S. Application Data

(60) Provisional application No. 60/884,401, filed on Jan. 10, 2007, provisional application No. 60/887,550, filed on Jan. 31, 2007.

(30) Foreign Application Priority Data

Mar. 14, 2007 (KR) .................... 10-2007-0025048

(51) Int. Cl.
*H04W 28/06*   (2009.01)

(52) U.S. Cl.
CPC .................. *H04W 28/065* (2013.01)

(58) Field of Classification Search
CPC .................................. H04W 28/065
USPC .................. 370/328, 338, 389, 392, 394
See application file for complete search history.

(56) References Cited

U.S. PATENT DOCUMENTS 6,374,115 B1   4/2002   Barnes et al.
6,421,359 B1   7/2002   Bennett et al.
(Continued)

FOREIGN PATENT DOCUMENTS

CN   1518236 A   8/2004
CN   1595362     3/2005
(Continued)

OTHER PUBLICATIONS

3GPP TSG-RAN WG1 #45, Meeting No. R1-061365, Shanghai, China, May 8-12, 2006.
(Continued)

*Primary Examiner* — Christopher Grey
(74) *Attorney, Agent, or Firm* — Dentons US LLP (57) ABSTRACT

A method of generating a data block in a wireless communication system is provided. The method includes preparing a first upper data block, a second upper data block and a third upper data block and generating a lower data block comprising a header, the first upper data block, the second upper data block and the third upper data block. The header includes a first length indicator and a second length indicator. The first length indicator indicates the length of the first upper data block and the second length indicator indicates the length of the second upper data block. Data rate can be improved by reducing the size of a header of data blocks.

6 Claims, 9 Drawing Sheets

(56) References Cited

U.S. PATENT DOCUMENTS

| | | | |
|---|---|---|---|
| 6,470,391 B2 | 10/2002 | Takamoto et al. | |
| 6,665,313 B1* | 12/2003 | Chang et al. | 370/469 |
| 6,697,347 B2 | 2/2004 | Ostman et al. | |
| 6,765,891 B2 | 7/2004 | Laitinen et al. | |
| 6,778,501 B1 | 8/2004 | Malmgren et al. | |
| 7,006,464 B1 | 2/2006 | Gopalakrishnan et al. | |
| 7,054,288 B2 | 5/2006 | Sternberg et al. | |
| 7,158,504 B2 | 1/2007 | Kadaba et al. | |
| 7,295,573 B2* | 11/2007 | Yi et al. | 370/469 |
| 7,359,924 B2 | 4/2008 | Balachandran et al. | |
| 7,542,457 B2 | 6/2009 | Wu | |
| 7,590,181 B2 | 9/2009 | Awad et al. | |
| 7,593,694 B2 | 9/2009 | Michel et al. | |
| 7,606,154 B1 | 10/2009 | Lee | |
| 7,623,483 B2 | 11/2009 | Yi et al. | |
| 7,639,644 B2 | 12/2009 | Sternberg et al. | |
| 7,646,742 B2 | 1/2010 | Petrovic et al. | |
| 7,650,559 B2* | 1/2010 | Nishibayashi et al. | 714/776 |
| 7,743,310 B2* | 6/2010 | Nishibayashi et al. | 714/776 |
| 7,764,661 B2 | 7/2010 | Heo et al. | |
| 7,801,563 B2 | 9/2010 | Hara et al. | |
| 7,844,884 B2* | 11/2010 | Roh et al. | 714/776 |
| 7,848,279 B2 | 12/2010 | Ranta-aho et al. | |
| 7,894,390 B2 | 2/2011 | Nakamata et al. | |
| 7,912,471 B2 | 3/2011 | Kodikara Patabandi et al. | |
| 8,054,786 B2 | 11/2011 | Wu et al. | |
| 8,054,788 B2 | 11/2011 | Ma et al. | |
| 8,059,681 B2* | 11/2011 | Kim et al. | 370/469 |
| 8,090,390 B2 | 1/2012 | Lee et al. | |
| 8,179,836 B2 | 5/2012 | Terry et al. | |
| 8,208,492 B2* | 6/2012 | Kim et al. | 370/469 |
| 8,259,687 B2 | 9/2012 | Foore et al. | |
| 2001/0055972 A1 | 12/2001 | Sakata | |
| 2002/0016178 A1 | 2/2002 | Kito | |
| 2002/0167961 A1 | 11/2002 | Haartsen | |
| 2002/0170013 A1 | 11/2002 | Bolourchi et al. | |
| 2002/0174276 A1* | 11/2002 | Jiang | 710/105 |
| 2002/0191641 A1 | 12/2002 | Lhermitte et al. | |
| 2003/0039230 A1 | 2/2003 | Ostman et al. | |
| 2003/0040313 A1 | 2/2003 | Hogan et al. | |
| 2003/0095519 A1* | 5/2003 | Kuo et al. | 370/338 |
| 2003/0157953 A1 | 8/2003 | Das et al. | |
| 2003/0181221 A1 | 9/2003 | Nguyen | |
| 2003/0207696 A1 | 11/2003 | Willenegger et al. | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0146067 A1 | 7/2004 | Yi et al. | |
| 2004/0162071 A1 | 8/2004 | Grilli et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0058078 A1 | 3/2005 | Jung et al. | |
| 2005/0068900 A1 | 3/2005 | Stephens et al. | |
| 2005/0074024 A1* | 4/2005 | Kim | H04L 12/18 370/432 |
| 2005/0083943 A1 | 4/2005 | Lee et al. | |
| 2005/0111487 A1 | 5/2005 | Matta et al. | |
| 2005/0122898 A1 | 6/2005 | Jang et al. | |
| 2005/0141436 A1 | 6/2005 | Dick et al. | |
| 2005/0207343 A1 | 9/2005 | Han | |
| 2005/0220116 A1 | 10/2005 | Ahn et al. | |
| 2005/0220145 A1 | 10/2005 | Nishibayashi et al. | |
| 2005/0237960 A1 | 10/2005 | Kim | |
| 2005/0250506 A1 | 11/2005 | Beale et al. | |
| 2006/0003733 A1 | 1/2006 | Chun et al. | |
| 2006/0018294 A1 | 1/2006 | Kynaslahti et al. | |
| 2006/0067238 A1 | 3/2006 | Olsson et al. | |
| 2006/0092911 A1* | 5/2006 | Hwang et al. | 370/349 |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0146833 A1 | 7/2006 | Roberts et al. | |
| 2006/0148411 A1 | 7/2006 | Cho et al. | |
| 2006/0152083 A1 | 7/2006 | Fuhr et al. | |
| 2006/0153237 A1 | 7/2006 | Hwang et al. | |
| 2006/0176811 A1 | 8/2006 | Yang et al. | |
| 2006/0176856 A1 | 8/2006 | Yang et al. | |
| 2006/0183429 A1 | 8/2006 | Anderson | |
| 2006/0203760 A1 | 9/2006 | Fukui et al. | |
| 2006/0245386 A1 | 11/2006 | Hu | |
| 2006/0251019 A1 | 11/2006 | Dalsgaard et al. | |
| 2006/0251105 A1* | 11/2006 | Kim et al. | 370/449 |
| 2006/0268919 A1 | 11/2006 | Malladi et al. | |
| 2007/0014229 A1 | 1/2007 | Hepler et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0180119 A1 | 8/2007 | Khivesara et al. | |
| 2007/0248060 A1 | 10/2007 | Mooney et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0016275 A1 | 1/2009 | Liu et al. | |
| 2009/0028123 A1 | 1/2009 | Terry et al. | |
| 2009/0088185 A1 | 4/2009 | Beale | |
| 2009/0143072 A1 | 6/2009 | Montojo et al. | |
| 2009/0221293 A1 | 9/2009 | Petrovic et al. | |
| 2009/0268676 A1 | 10/2009 | Wigard et al. | |
| 2010/0034139 A1 | 2/2010 | Love et al. | |
| 2010/0091721 A1 | 4/2010 | Larmo et al. | |
| 2010/0208667 A1 | 8/2010 | Chun et al. | |
| 2011/0190001 A1 | 8/2011 | Kodikara Patabandi et al. | |

FOREIGN PATENT DOCUMENTS

| | | |
|---|---|---|
| CN | 1613210 A | 5/2005 |
| CN | 1735089 A | 2/2006 |
| CN | 1805594 | 7/2006 |
| CN | 1805596 | 7/2006 |
| EP | 1 168 759 A2 | 1/2002 |
| EP | 1351538 A1 | 10/2003 |
| EP | 1418717 A1 | 5/2004 |
| EP | 1 432 261 | 6/2004 |
| EP | 1553798 A1 | 7/2005 |
| EP | 1708524 A1 | 10/2006 |
| EP | 1 720 322 A1 | 11/2006 |
| EP | 1 724 948 A1 | 11/2006 |
| EP | 1748593 A1 | 1/2007 |
| EP | 1755355 | 2/2007 |
| EP | 1845650 | 4/2007 |
| EP | 1843504 | 10/2007 |
| EP | 1845649 | 10/2007 |
| JP | 2001-78272 A | 3/2001 |
| JP | 2002-247042 A | 8/2002 |
| JP | 2002-527945 | 8/2002 |
| JP | 2002-290413 A | 10/2002 |
| JP | 2003-304574 A | 10/2003 |
| JP | 2005-160079 | 6/2005 |
| JP | 2005-525065 | 8/2005 |
| JP | 2006-121282 | 5/2006 |
| JP | 2006-121394 | 5/2006 |
| JP | 2006-148490 A | 6/2006 |
| JP | 2006-237897 A | 9/2006 |
| JP | 2006-524444 | 10/2006 |
| JP | 2006-311411 A | 11/2006 |
| JP | 2006-524969 | 11/2006 |
| JP | 2006325264 A | 11/2006 |
| JP | 2006-352708 A | 12/2006 |
| JP | 2007-533276 A | 11/2007 |
| JP | 2009-535957 | 10/2009 |
| KR | 10-2007-0000412 A | 1/2001 |
| KR | 1020020000649 A | 1/2002 |
| KR | 10-2002-0014939 | 2/2002 |

(56) References Cited

FOREIGN PATENT DOCUMENTS

| KR | 10-2002-0061512 A | 7/2002 |
|---|---|---|
| KR | 10-0365356 | 12/2002 |
| KR | 10-2003-0049176 A | 6/2003 |
| KR | 10-040178 B1 | 11/2003 |
| KR | 10-0404178 B1 | 11/2003 |
| KR | 10-2005-0073237 A | 7/2005 |
| KR | 10-2005-0118591 | 12/2005 |
| KR | 1020060036120 A | 4/2006 |
| KR | 20-0391476 A | 5/2006 |
| KR | 10-2006-0087355 A | 8/2006 |
| KR | 1020060090134 A | 8/2006 |
| KR | 1020060109799 A | 10/2006 |
| KR | 10-2006-0115175 | 11/2006 |
| KR | 1020060115037 A | 11/2006 |
| RU | 2280327 | 4/2005 |
| RU | 2004132193 A | 4/2005 |
| RU | 2 322 765 C2 | 4/2008 |
| RU | 2009 132 470 A | 3/2011 |
| RU | 2428819 C2 | 9/2011 |
| TW | 1256215 B | 6/2006 |
| WO | WO 97/11566 | 3/1997 |
| WO | WO 98/24250 | 6/1998 |
| WO | 0021253 A1 | 4/2000 |
| WO | WO 00/21253 | 4/2000 |
| WO | 02073894 | 9/2002 |
| WO | WO 02/093296 | 11/2002 |
| WO | WO 03/085874 | 10/2003 |
| WO | WO 03/096149 | 11/2003 |
| WO | WO 03/096567 | 11/2003 |
| WO | WO 2004/017541 | 2/2004 |
| WO | 2004028041 A1 | 4/2004 |
| WO | WO 2004/042952 A1 | 5/2004 |
| WO | WO 2004/098072 | 11/2004 |
| WO | WO 2004/102836 | 11/2004 |
| WO | WO 2005/015801 | 2/2005 |
| WO | WO 2005/048613 | 5/2005 |
| WO | 2005096522 A1 | 10/2005 |
| WO | WO 2005/119941 | 12/2005 |
| WO | WO 2005/125252 A1 | 12/2005 |
| WO | 2004 126 160 A | 1/2006 |
| WO | 2006/022876 A1 | 3/2006 |
| WO | WO 2006/022876 A1 | 3/2006 |
| WO | WO 2006-052208 A1 | 5/2006 |
| WO | 2006/083149 A1 | 8/2006 |
| WO | WO 2006/105333 | 10/2006 |
| WO | WO 2007/068304 | 10/2006 |
| WO | WO 2006/118418 | 11/2006 |
| WO | 2007002202 A2 | 1/2007 |
| WO | 2007051281 | 5/2007 |
| WO | 2007125428 A2 | 11/2007 |
| WO | WO 2007/125428 | 11/2007 |

OTHER PUBLICATIONS

3GPP TSG RAN WG1 #46bis, Meeting No. R1-062534, Seoul, Korea, Oct. 9-13, 2006.
3GPP TSG RAN WG1 #47, Meeting No. R1-063177, Riga, Latvia, Nov. 6-10, 2006.
3GPP TSG RAN WG1#47, Meeting No. R1-063220, Riga, Latvia, Nov. 6-10, 2006.
3GPP TSG-RAN WG2#53, Meeting No. R2-061129, Shanghai, China, May 8-12, 2006.
3GPP TSG-RAN WG2, Meeting No. R2-063,Riga, Latvia, Dec. 12, 2006.
Nokia Corporation et al., "On Resource Release in Enhanced UL for CELL_FACH", 3GPP Draft; R2-080272, Jan. 7, 2008.
NEC, "Comparison of HS-based E-RACH resource assignment", 3GPP Draft; R2-080128, Comparison of HS-Based E-Rach Resource Assignment, 3rd Generation Partnership Project (3GPP), Jan. 9, 2008.
LG Electronics, "Load Management of E-DCH Resource Release", 3GPP TSG-RAN WG2 #61BIS, R2-081829, Mar. 31, 2008, p. 1-4.
Ericsson, "Back-off operation for enhanced uplink in CELL_FACH", 3GPP Draft, R2-081502_EUL_BACK_OFF, 3rd Generation Partnership Project (3GPP), Mar. 25, 2008.
Nokia, "ARQ operation with HARQ-ARQ interaction", 3GPP TSG-RAN WG2 Meeting #55, R2-062765, Oct. 2006.
Ericsson, "Uplink HARQ-ARQ Interactions for NACK → ACK error", 3GPP TSG-RAN WG2 #56, Tdoc R2-063238, Nov. 2006.
Samsung, "MAC functions: ARQ", 3GPP TSG-RAN2 Meeting #51, Tdoc R2-060374, Feb. 2006.
Herrmann et al., "Improving packet loss probability in the UMTS high-speed downlink", Vehicular Technology Conference, 2003. VTC 2003—Fall. 2003 IEEE 58th, vol. 4, pp. 2655-2659, Oct. 2003.
"Universal Mobile Telecommunications System (UMTS): User Equipment (UE) procedures in idle mode and procedures for cell reselection in connected mode (3GPP TS 25.304 version 7.1.0 Release 7); ETSI TS 125 304", vol. 3-R2, No. V7.1.0, Dec. 2006, XP014039981.
"Universal Mobile Telecommunications System (UMTS): High Speed Downlink Packet Access (HSDPA); Overall Description; Stage 2 (3GPP TS 25.308 version 7.1.0 Release 7); ETSI TS 125 308", vol. 3-R2, No. V7.1.0, Dec. 2006, XP014039997.
"3rd Generation Partnership Project; Technical Specification Group Radio Access Network; Radio Link Control (RLC) Protocol Specification (Release 7)", 3GPP Standard; 3GPP TS 25.322, 3rd Generation Partnership Project (3GPP), Mobile Competence Centre; 650, Route Des Lucioles; F-06921 Sophia-Antipolis Cedex; France, No. V7.2.0, Sep. 1, 2006, pp. 1-80, XP050367794.
Pietro Nicoletti: "IEEE 802.11 frame format", Jun. 1, 2005, pp. 1-23, XP055083596, Retrieved from the Internet: URL:http://www.studioreti.it/slide/802-11-Frame_E_C.pdf [retrieved on Oct. 11, 2013].
Torres D: "Wireless Services R-Evolution: A Practical Overview of HSDPA", British Telecommunications Engineering, British Telecommunications Engineering. London, GB, vol. 4, No. 3, Jul. 1, 2005, pp. 161-167, XP001504561, ISSN: 0262-401X.
Ericsson: "Enhanced CELL_FACH", 3GPP Draft; R2-063209, vol. RAN WG2, Nov. 1, 2006.
Ericsson: "Semi persistent scheduling", 3GPP Draft; R2-062859, 3rd Generation Partnership Project (3GPP), Mobile Competence Centre ; 650, Route Des Lucioles ; F-06921 Sophia-Antipolis Cedex; France, vol. RAN WG2, No. Seoul, Korea; Oct. 5, 2006, XP050132382.
Nokia, Further discussion on delay enhancements in Rel7 , 3GPP TSG RAN WG2 Meeting #53, Shanghai, China, May 8-12, 2006, R2-061189.
"3rd Generation Partnership Project", "Technical Specification Group Radio Access Network"; "Physical Layer Aspects for Evolved UTRA", 3GPP TR 25.814 V1.5.0 DRAFT; May 2006.
LG Electronics: "LTE System Information", 3GPP TSG-RAN Working Group 2 #53; R2-061476, Shanghai, China, May 2006.
"3rd Generation Partnership Project", "Technical Specification Group Radio Access Network"; "Evolved Universal Terrestrial Radio Access (E-UTRA)" and "Evolved Universal Terrestrial Radio Access Network (E-UTRAN)", 3GPP TR 25.813 V7.1.0; Sep. 2006.
3GPP TR 25.814 V1.5.0, Myung Cheul, May 2006, V1.5.0, Release 7.
Siemens AG: "TDD: Measurement and Reporting Concept for 25.331", 3GPP Draft; R2-99B55, 3rd Generation Partnership Project (3GPP), Mobile Competence Centre ; 650, Route Des Lucioles ; F-06921 Sophia-Antipolis Cedex ; France, vol. RAN WG2, No. Sweden; Sep. 30, 1999, XP050113684.
Samsung:"DL control channel structure: overview", 3GPP Draft; R1-063272, 3rd Generation Partnership Project (3GPP), Mobile Competence Centre ; 650, Route Des Lucioles; F-06921 Sophia-Antipolis Cedex; France, vol. RAN WG1, No. Riga, Latvia; Nov. 1, 2006, XP050103722.
3GPP Draft; R2-062440; Enhance Cell Fach R2, 3rd Generation Partnership Project(3GPP), Mobile Competence Centre ; 650, Route Des Lucioles ; F-06921 Sophia-Antipolis Cedex, France, vol. RAN WG2, No. Tallinn; Aug. 24, 2006, XP050132021, retrieved on Aug. 24, 2006, the whole document.
Nokia: Further discussion on delay enhancements in ReIP, 3GPP Draft; R2-061189 Cell Fach Enhancement, 3rd Generation Partnership Project (3GPP), Mobile Competence Centre; 650, Route Des (56) References Cited

OTHER PUBLICATIONS

Lucioles ; F-06921 Sophia-Antipolis Cedex, France, vol. RAN WG2, No. Shanghai, China; May 4, 2006,XP050131139, retrieved on May 4, 2006, the whole document.
Antti Toskala et al: "chapter 11 High-speed downlink packet access", WCDMA for UMTS: Radio Access for Third Generation Mobilecommunications, XX, XX, Jan. 1, 2002, pp. 279-304, XP002458223, the whole document.
"Scheduling of System Information", 3GPP Draft; R2-070220, 3rd Generation Partnership Project (3GPP), Mobile Competence Centre ; 650, Route Des Lucioles ; F-06921 Sophia-Antipolis Cedex ; France, Sorrento, Italy; vol. RAN WG2; Retrieved on Jan. 12, 2007, XP050133321.
Nokia (Rapporteur): "System Information Classification", 3GPP Draft; R2-063077 SI Classification, 3rd Generation Partnership Project (3GPP), Mobile Competence Centre ; 650, Route Des Lucioles ; F-06921 Sophia-Antipolis Cedex; France, Riga, Latvia; Retrieved on Nov. 1, 2006, vol. RAN WG2, XP050132586.
Qualcomm Europe: "Design and Performance of BCH for E-UTRA", 3GPP Draft; R1-062688, 3rd Generation Partnership Project (3GPP), Mobile Competence Centre ; 650, Route Des Lucioles ; F-06921 Sophia-Antipolis Cedex ; France, Seoul, Korea; Retrieved on Oct. 4, 2006, vol. RAN WG1, XP050103177.
R2-061476: TSG-RAN Working Group 2 #53 Shanghai, China May 8-May 12, 2006 Source: LG Electronics, LTE System Information.
3GPP TR 25.813 V7.1.0: 3rd Generation Partnership Project; Technical Specification Group Radio Access Network; Evolved Universal Terrestrial Radio Access and Evolved Universal Terrestrial Radio Access Network; Radio interface protocol aspects (Sep. 2006).
3GPP TR 25.814 V1.5.0 (May 2006), "3rd Generation Partnership Project; Technical Specification Group Radio Access Network; Physical Layer Aspects for Evolved UTRA (Release 7)".

\* cited by examiner

| D/C | SN(Sequence Number) | | | Oct1 |
|---|---|---|---|---|
| | | P | HE | Oct2 |
| LI(Length Indicator) | | | E | Oct3 |

⋮

| LI(Length Indicator) | E |
|---|---|
| Data | |
| PDA or a piggybacked STATUS PDU | OctN |

FIG. 5

| SDU | 33 | 34 | 35 | 36 | 37 | 38 | 39 | |
|---|---|---|---|---|---|---|---|---|
| PDU | 21 | 22 | 23 | 24 | 25 | 26 | 27 | 28 |

METHOD OF GENERATING DATA BLOCK IN WIRELESS COMMUNICATION SYSTEM

This application claims priority to PCT/KR2008/000149, filed on Jan. 10, 2008, U.S. Provisional Application No. 60/884,401 filed Jan. 10, 2007, U.S. Provisional Application No. 60/887,550, filed Jan. 31, 2007, and Korean Patent Application No. 10-2007-0025048 filed on Mar. 14, 2007, all of which are hereby incorporated by reference in their entirety.

TECHNICAL FIELD

The present invention relates to wireless communication, and more specifically, to a method of generating a data block in which a header of the data block is optimized to enhance transmission efficiency.

BACKGROUND ART

A Global System for Mobile Communications (GSM) is a European digital mobile communication system that is generally called a second generation communication system. The GSM in an early stage is focused on supporting voice services using a circuit-switched technique and thus is lacks of consideration of packet data. Although a General Packet Radio Service (GPRS) is introduced to enhance transmission efficiency of packet data, as demands on voice services have reached saturation point and customers' expectancy level toward provided services is elevated, demands on multimedia services provided through wireless networks are increased, and hence a limitation of the second generation communication systems has become an issue.

A Universal Mobile Telecommunications System (UMTS) is a third generation mobile communication system developed by Europe. The UMTS employs a Wideband Code Division Multiple Access WCDMA) as a radio access technique. The WCDMA is a Direct Sequence-CDMA (DS-CDMA) technique of a Frequency Division Duplex (FDD) scheme, which transmits data using a bandwidth of 5 MHz in a frequency band of 2 GHz.

Generally, layers of a radio interface protocol between a user equipment and a base station can be divided into L1 (a first layer), L2 (a second layer), and L3 (a third layer) based on the lower three layers of the Open System Interconnection (OSI) model that is well-known in communication systems.

Data is processed and transmitted and/or received in the unit of a certain data block between the layers. When data blocks are moved between layers, a plurality of upper data blocks can be configured as one lower data block. In order to reproducing the plurality of upper data blocks, a header can be added to the lower data block. The header is information that is not contributed to improve data rate and thus operates as a transmission overhead. Therefore, there is a need for a method of efficiently configuring a header of a data block so as to enhance data transmission efficiency.

DISCLOSURE OF INVENTION

Technical Problem

The present invention provides a method of generating a data block in which a header of the data block is optimized in configuring a data block such as a RLC (Radio Link Control) PDU (Protocol Data Unit) to enhance transmission efficiency.

Technical Solution

In one aspect, a method of generating a data block in a wireless communication system is provided. The method includes preparing a first upper data block, a second upper data block and a third upper data block and generating a lower data block comprising a header, the first upper data block, the second upper data block and the third upper data block, the header comprising a first length indicator and a second length indicator, wherein the first length indicator indicates the length of the first upper data block and the second length indicator indicates the length of the second upper data block.

In another aspect, a method of generating a RLC PDU in a wireless communication system is provided. The method includes generating a RLC PDU comprising a header and a data field, the data field comprising a plurality of data field elements, the header comprising at least two length indicators, wherein a first length indicator indicates the length of a first data field element and a second length indicator indicates the length of a second data field element.

In still another aspect, a data block in a wireless communication system is provided. The data block includes a plurality of upper data blocks, wherein an upper data block is a RLC SDU or a RLC SDU segment and a header comprising at least two length indicators, a first length indicator indicating the length of a first upper data block, a second length indicator indicating the length of a second upper data block.

In still another aspect, a wireless device includes a RF (Radio Frequency) unit for transmitting and receiving radio signals and a processor coupled to the RF unit, having a RLC layer. The processor is configured to generate a data block comprising a header and a data field, the data field comprising a plurality of data field elements, the header comprising at least two length indicators, wherein a first length indicator indicates the length of a first data field element and a second length indicator indicates the length of a second data field element.

In still another aspect, a method of generating a RLC PDU in a wireless communication system is provided. The method includes generating a RLC PDU comprising a length indicator field and a corresponding data field, wherein the length indicator field indicates the length of the corresponding data field.

Advantageous Effects

Data rate can be improved by reducing the size of a header of data blocks. By increasing allowable size of data field elements, data blocks can be constructed more flexibly.

MODE FOR THE INVENTION

Figure 1:
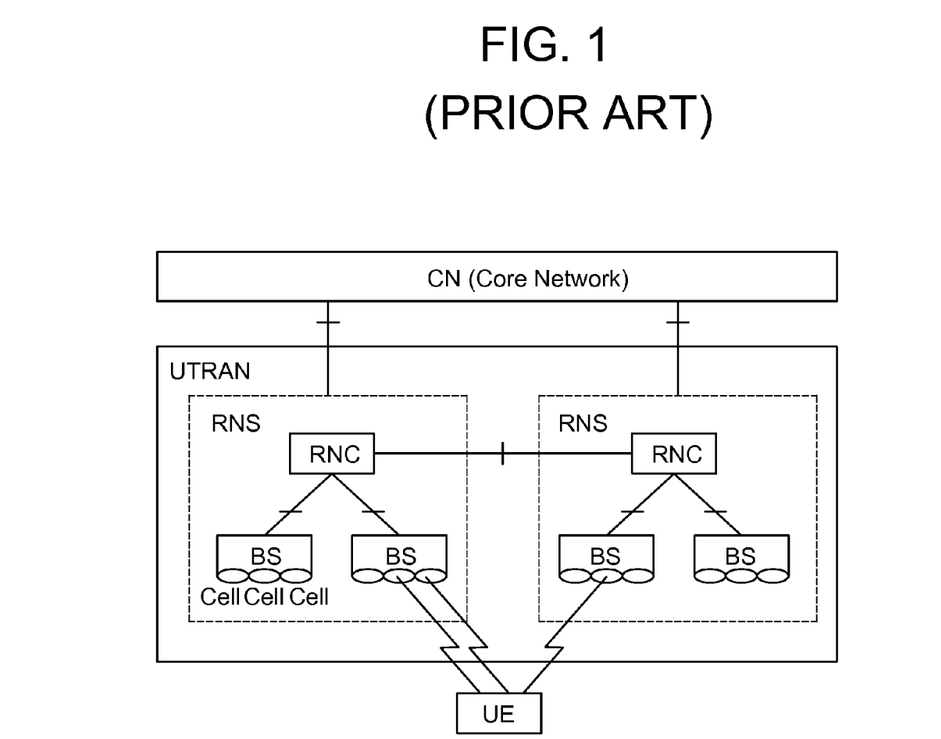
FIG. 1 is a block diagram showing a wireless communication system.

FIG. 1 is a block diagram showing a wireless communication system. This may be a network structure of a UMTS (Universal Mobile telecommunications System). The wireless communication systems are widely deployed to provide a variety of communication services such as voices, packet data, and the like.

Referring to FIG. 1, a UMTS includes a UTRAN (UMTS Terrestrial Radio Access Network) and a core network. A user equipment (UE) can be fixed or mobile and can be referred to as another terminology, such as an MS (Mobile Station), UT (User Terminal), SS (Subscriber Station), wireless device, or the like. The UTRAN comprises one or more RNSs (Wireless network Subsystems), and each of the RNSs comprises a RNC (Wireless network Controller) and one or more base stations (BSs) managed by the RNC. There are one or more cells within the coverage of a base station. The base station generally is a fixed station that communicates with the user equipment and can be referred to as another terminology, such as a Node-B, BTS (Base Transceiver System), access point, or the like. Hereinafter, downlink means a communication from the base station to the user equipment, and uplink means a communication from the user equipment and the base station.

Figure 2:
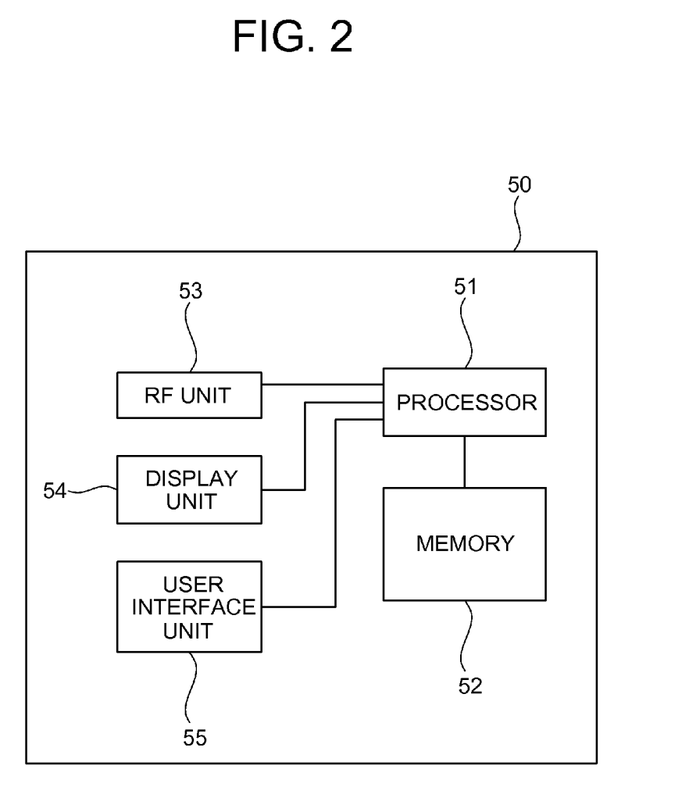
FIG. 2 is a block diagram showing constitutional elements of a user equipment.

FIG. 2 is a block diagram showing constitutional elements of a user equipment. A user equipment 50 includes a processor 51, memory 52, an RF unit 53, a display unit 54, and a user interface unit 55. The memory 52 is coupled to the processor 51 and stores operating systems, applications, and general files. The display unit 54 displays a variety of information on the user equipment and may use a well-known element, such as an LCD (Liquid Crystal Display), OLED (Organic Light Emitting Diode), or the like. The user interface unit 55 can be configured with a combination of well-known user interfaces such as a keypad, touch screen, and the like. The RF unit 53 is coupled to the processor 53 and transmits and/or receives radio signals.

Functions of layers of a radio interface protocol are implemented in the processor 51. The processor 51 provides a control plane and a user plane.

Layers of the radio interface protocol between a user equipment and a base station can be divided into L1 (a first layer), L2 (a second layer), and L3 (a third layer) based on the lower three layers of the Open System Interconnection (OSI) model that is well-known to communication systems.

Figure 3:
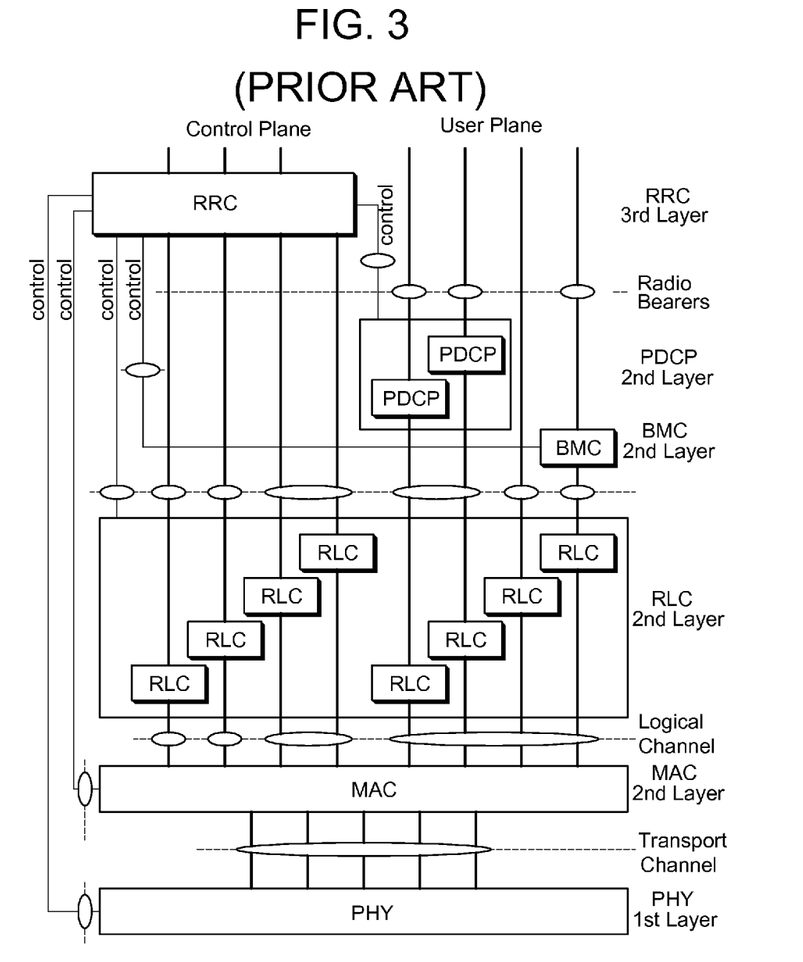
FIG. 3 is a view showing the structure of a radio protocol.

FIG. 3 is a view showing the structure of a radio protocol. Layers of the radio protocol exist in pairs between a user equipment and a UTRAN and take in charge of transmitting data of a radio section.

Referring to FIG. 3, a PHY (physical) layer belonging to a first layer transmits data in a radio section using a variety of radio transmission techniques. The PHY layer is coupled to a MAC (Medium Access Control) layer, which is an upper layer of the PHY layer, through a transport channel. The transport channel can be classified into a dedicated transport channel and a common transport channel depending on whether or not the channel is shared.

The second layer comprises a MAC layer, a RLC (Radio Link Control) layer, a PDCP (Packet Data Convergence Protocol) layer, and a BMC (Broadcast/Multicast Control) layer.

A MAC layer maps a logical channel to a transport channel, and performs logical channel multiplexing for mapping a plurality of logical channels to one transport channel. The MAC layer is coupled to a RLC layer, i.e. an upper layer of the MAC layer, through a logical channel. The logical channel is classified into a control channel for transmitting information on the control plane and a traffic channel for transmitting information on the user plane, depending on the type of transmitted information. The MAC layer is specifically divided into a MAC-b sublayer, MAC-d sublayer, MAC-c/sh sublayer, MAC-hs sublayer, and MAC-e sublayer, depending on the type of a managed transport channel. The MAC-b sublayer manages a BCH (Broadcast channel), i.e., a transport channel for broadcasting system information, the MAC-c/sh sublayer manages common transport channels shared with other user equipments, such as a FACH (Forward Access Channel), DSCH (Downlink Shared Channel), and the like, and the MAC-d sublayer manages a DCH (dedicated channel) that is a transport channel dedicated to a specific user equipment. In addition, in order to support high speed data transmission in the uplink and downlink, the MAC-hs sublayer manages a HS-DSCH (High Speed Downlink Shared Channel) that is a transport channel for high speed downlink transmission, and the MAC-e sublayer manages an E-DCH (Enhanced Dedicated Channel) that is a transport channel for high speed uplink transmission.

A RLC layer guarantees QoS (Quality of Service) of each radio bearer (RB). The RLC layer has one or two independent RLC entities for each RB in order to guarantee QoS unique to the RB. The RLC layer provides three RLC modes, i.e., a transparent mode (TM), an unacknowledged mode (UM), and an acknowledged mode (AM), in order to support a variety of QoSs. In addition, the RLC layer adjusts a size of data appropriate to a lower layer to transmit the data into a radio section, and for this purpose, also performs segmentation and reassembly of data received from an upper layer.

A PDCP layer is located above the RLC layer and allows data that is transmitted using packets of an IP (Internet Protocol), such as IPv4 or IPv6, to be efficiently transmitted in a radio section of a relatively narrow bandwidth. For this purpose, the PDCP layer performs a header compression function, which allows only absolutely needed information, among the header part of data, to be transmitted to enhance transmission efficiency of a radio section. Since header compression is the basic function of the PDCH layer, the PDCH layer only exists in a PS (Packet Service) domain, and one PDCH entity exist for one RB in order to provide an effective header compression function for each PS service.

In the second layer, a BMC layer is placed above the RLC layer, schedules cell broadcast messages, and broadcasts the cell broadcast messages to user equipments.

A RRC (Radio Resource Control) layer located at the lowest portion of the third layer is defined only on the control plane. The RRC layer controls parameters of the first and second layers in relation with configuration, reconfiguration, and release of RBs, and controls logical channels, transport channels, and physical channels. A RB means a logical path provided by the first and second layers of the radio protocol to transfer data between a user equipment and the UTRAN. Establishing the RB means a procedure of specifying characteristics of the radio protocol layers and channels needed to provide a specific service and setting specific parameters and an operation method of each layer and channel.

The fundamental function of a RLC layer is to guarantee QoS of each RB and transmit data corresponding thereto. Since the RB service is a service provided by the second layer of the radio protocol to an upper layer, the entire second layer affects the QoS. However, among the services provided by the second layer, the RLC layer most particularly affects the QoS. Since the three modes provided by the RLC, i.e., TM, UM, and AM, support different QoSs, the methods and functions of the three modes are different from each other.

The TM RLC is a mode that does not attach any overhead to a RLC SDU (Service Data Unit) transferred from an upper layer in configuring a RLC PDU (Protocol Data Unit). The PDU is a data block unit transferred from a corresponding layer to another layer, and the SDU is a data block unit transferred from another layer to the corresponding layer. A RLC SDU a data block transferred from another layer to the RLC layer. The RLC SDU coming down from an upper layer to the RLC layer can be referred to as an upper data block, and a RLC PDU configured using RLC SDUs can be referred to as a lower data block. Since the RLC layer transparently passes through the SDUs, it is called as a TM RLC, and due to such a characteristic, the TM RLC performs following functions on the user and control planes. On the user plane, since data processing time within the RLC layer is short, the TM RLC mainly transmits realtime circuit data such as voices or streams of the CS (Circuit Service) domain. On the control plane, since an overhead is not attached in the RLC layer, the TM RLC transmits an RRC message in uplink or downlink.

A mode in which an overhead is added unlike the TM RLC is referred to as a non-transparent mode, and there are two types of the non-transparent mode, i.e., a mode where there is no acknowledgement (UM) and a mode where there is an acknowledgement (AM) for transmitted data. The UM RLC transmits a PDU attached with a PDU header including a sequence number (SN) to allow a receiver to know which PDU has been lost while being transmitted. Due to such a function, on the user plane, the UM RLC mainly transmits broadcast/multicast data or real-time packet data such as voices (e.g., Voice Over Internet Protocol (VoIP)) or streams of the PS domain. On the control plane, the UM RLC transmits an RRC message that does not need an acknowledgement among RRC messages transmitted to a specific user equipment or a specific user equipment group within a cell.

Although the AM RLC, which is one of the non-transparent modes, configures a PDU by attaching a PDU header including an SN in the same manner as the UM RLC does when configuring the PDU, there is a big difference in that a receiver transmits an acknowledgement in response to a PDU transmitted by the transmitter, unlike the UM RLC. The reason that the receiver responses in the AM RLC mode is to request the transmitter to retransmit a PDU that the receiver does not receive. An object of the AM RLC is to guarantee error-free data transmission through retransmission. On the user plane, the AM RLC mainly transmits non-real-time packet data like TCP/IP of the PS domain. On the control plane, the AM RLC transmits an RRC message that absolutely needs an acknowledgement among RRC messages transmitted to a specific user equipment within a cell.

In the aspect of directionality, the TM and UM RLCs are used in uni-directional communication, whereas the AM RLC is used in a bi-directional communication since there is feedback from a receiver. Since such a bi-directional communication is mainly used in a point-to-point communication, the AM RLC uses only a dedicated logical channel. There is also a difference in the aspect of a structure in that one RLC entity is structured as either a transmitter or a receiver in the TM and UM RLCs, whereas both a transmitter and a receiver exist in one RLC entity in the AM RLC.

Complexity of a AM RLC is caused by a retransmission function. In order to manage retransmission, the AM RLC has a retransmission buffer in addition to a transmission buffer and a receive buffer, uses transmitting and receiving windows for flow control, and performs a variety of functions, such as polling that a transmitter requests status information to a receiver of a peer RLC entity, a STATUS report that the receiver reports its buffer status to the transmitter of the peer RLC entity, a function of a status PDU for loading and transferring status information, a piggyback function for inserting the status PDU into a data PDU to enhance efficiency of data transmission, and the like. There are a reset PDU for requesting a counterpart AM RLC entity to reset all operations and parameters when a serious error is detected while an AM RLC entity is operating, and a reset acknowledgement PDU used as a response to such a reset PDU. In addition, the AM RLC also needs a variety of protocol parameters, together with status variables and a timer, to support such functions. PDUs used by the AM RLC to control data transmission, such as a status information report, status PDU, reset PDU, and the like, are called as a control PDU, and PDUs used to transfer user data are called as a data PDU.

RLC PDUs used by the AM RLC can be categorized into a RLC data PDU and a RLC control PDU. The RLC data PDU is used by TM, UM, and AM RLC entities to transfer upper layer PDUs (i.e., RLC SDUs). An AMD PDU is used by an AM RLC entity to transfer upper layer PDUs. There are four types of control PDUs, including a status PDU, piggybacked status PDU, reset PDU, and reset acknowledgement PDU.

One of the cases where a control PDU is used is reset procedure. The reset procedure is used to resolve an error situation in an operation of the AM RLC, e.g., a situation where sequence numbers used by a transmitter and receiver are not matched or a PDU or SDU is failed to be transmitted for a predetermined number of times. If the reset procedure is used, the AM RLCs of the transmitter and receiver begin communication after initializing variables. The reset procedure operates as follows. First, a side that determines to start the reset procedure, i.e., the AM RLC of the transmitter, includes a transmitting direction HFN (Hyper Frame Number) value that is currently uses into a reset PDU and transmits the reset PDU to the receiver. Next, if the AM RLC of the receiver receives the reset PDU, it resets the HFN value of the receiving direction and initializes variables such as a sequence number and the like. Then, the AM RLC of the receiver includes its transmitting direction HFN value into a reset acknowledgement PDU and transmits the reset acknowledgement PDU to the AM RLC of the transmitter. After receiving the reset acknowledgement PDU, the AM RLC of the transmitter resets its receiving direction HFN value and initializes variables.

Figure 4:
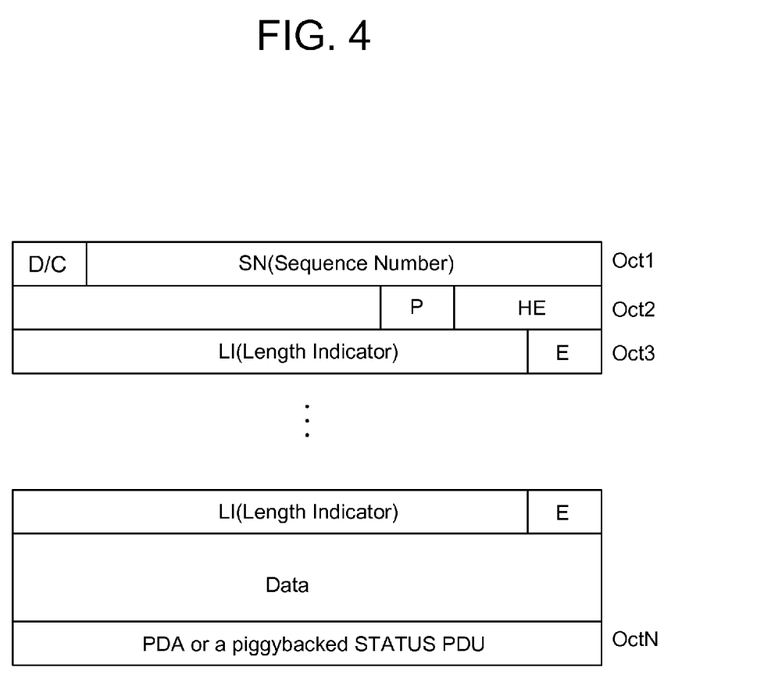
FIG. 4 is a view showing the format of an AMD PDU according to an embodiment of the present invention.

FIG. 4 is a view showing the format of an AMD PDU according to an embodiment of the present invention. The AMD PDU is a RLC data PDU transmitted by an AM RLC entity. An AM RLC entity uses the AMD PDU to transmit user data, or piggybacked status information and polling bits.

Referring to FIG. 4, a RLC PDU includes a header and a data field. The data field is a region including at least one upper data block (a RLC SDU or a RLC SDU segment). The upper data block included in the data field is called as a data field element. The header includes a sequence number (SN) field, a D/C (Data/Control) field, a P (Polling) field, and a LI (Length Indicator) field.

The SN field indicates the sequence number of the corresponding AMD PDU. The D/C field indicates whether the RLC PDU is a RLC data PDU or RLC control PDU. The P field indicates whether or not an AM RLC entity of the transmitting side requests a STATUS report from its peer AM RLC entity. The HE (Header Extension) field indicates whether a Data field follows or a set of E field and LI field follows. If the HE field is set to '00', it means that the next field is a Data field, and if the HE field is set to '01', it means that the next field is an LI field.

An E (Extension) field indicates whether a Data field follows or a set of E field and LI field follows. If the E field is set to '0', it indicates that the next field is data, padding, or piggybacked status information. If the E field is set to '1', it means that the next field is a set of LI and E fields.

The LI field indicates the length in bytes of the corresponding Data field element present in the RLC PDU. When the RLC PDU includes three Data field elements (i.e. one RLC SDU segment and two RLC SDUs), there are two LIs in the RLC PDU header. A first LI present in the RLC PDU header corresponds to the first Data field element present in the Data field of the RLC PDU, and a second LI present in the RLC PDU header corresponds to the second Data field element present in the Data field of the RLC PDU.

Although the length of the LI field can be 7 or 15 bits, it is not restriction. The LI field can have a variety of lengths such as 11 bits or the like.

It is to be understood that FIG. 4 is for illustrative purposes and is for illustrating some elements of header of the AMD PDU in accordance with the present disclosure, and is not intended to a complete format of the AMD PDU. Therefore, the header of the AMD PDU may include various other elements not shown in FIG. 4 and still be within the scope of the present disclosure.

An LI that is set to a special value to indicate the end or start point of an SDU included in the Data field can be added. Table 1 shows examples of an LI that is set to a special value of 7 bits.

TABLE 1

| bits | description |
| --- | --- |
| 0000000 | The previous RLC PDU was exactly filled with the last segment of an RLC SDU and there is no "Length Indicator" that indicates the end of the RLC SDU in the previous RLC PDU. |
| 1111100 | UMD PDU: The first data octet in this RLC PDU is the first octet of an RLC SDU. AMD PDU: Reserved (PDUs with this coding will be discarded by this version of the protocol). |
| 1111101 | UMD PDU: The first data octet in this RLC PDU is the first octet of an RLC SDU and the last octet in this RLC PDU is the last octet of the same RLC SDU. AMD PDU: Reserved (PDUs with this coding will be discarded by this version of the protocol). |
| 1111110 | AMD PDU: The rest of the RLC PDU includes a piggybacked STATUS PDU. UMD PDU: The RLC PDU contains a segment of an SDU but neither the first octet nor the last octet of this SDU. |
| 1111111 | The rest of the RLC PDU is padding. The padding length can be zero. |

Table 2 shows examples of an LI that is set to a special value of 15 bits.

TABLE 2

| bits | description |
| --- | --- |
| 000000000000000 | The previous RLC PDU was exactly filled with the last segment of an RLC SDU and there is no "Length Indicator" that indicates the end of the RLC SDU in the previous RLC PDU. |
| 111111111111010 | UMD PDU: The first data octet in this RLC PDU is the first octet of an RLC SDU and the second last octet in this RLC PDU is the last octet of the same RLC SDU. The remaining one octet in the RLC PDU is ignored. |
| 111111111111011 | The last segment of an RLC SDU was one octet short of exactly filling the previous RLC PDU and there is no "Length Indicator" that indicates the end of the RLC SDU in the previous RLC PDU. The remaining one octet in the previous RLC PDU is ignored. |
| 111111111111100 | UMD PDU: The first data octet in this RLC PDU is the first octet of an RLC SDU. AMD PDU: Reserved (PDUs with this coding will be discarded by this version of the protocol). |
| 111111111111101 | UMD PDU: The first data octet in this RLC PDU is the first octet of an RLC SDU and the last octet in this RLC PDU is the last octet of the same RLC SDU. AMD PDU: Reserved (PDUs with this coding will be discarded by this version of the protocol). |
| 111111111111110 | AMD PDU: The rest of the RLC PDU includes a piggybacked STATUS PDU. UMD PDU: The RLC PDU contains a segment of an SDU but neither the first octet nor the last octet of this SDU. |
| 111111111111111 | The rest of the RLC PDU is padding. The padding length can be zero. |

Figure 5:
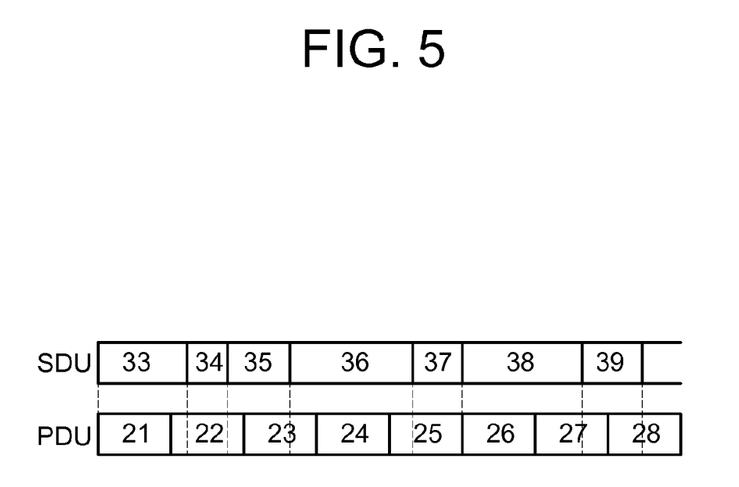
FIG. 5 is a view showing an example of configuring PDUs from SDUs.

FIG. 5 is a view showing an example of configuring PDUs from SDUs. If SDUs are transferred from an upper layer, AMD PDUs of a predetermined size are generated by segmenting or reassembling the SDUs. An AMD PDU comprises a Data field and a header, and the Data field includes at least one Data field element. The Data field element may be an SDU segment or an SDU. The header includes the SN of the PDU and LIs indicating lengths of Data field elements.

Referring to FIG. 5, it is assumed that previous 32 SDUs are loaded on previous 20 PDUs and successfully transmitted already. SDUs from SDU 33 are transferred to the AM RLC as shown in the figure, and the AM RLC segments or reassembles the SDUs and generates AMD PDUs of a predetermined size. Although SDUs up to SDU 39 are shown in the figure, SDUs are subsequently transferred to the AM RLC in practice, and the AM RLC continuously configures PDUs for the transferred SDUs. The header of an AMD PDU includes the SN of the PDU, and if there is a boundary of SDUs in the configured PDU, an LI that indicates the boundary is also added.

Figure 6:
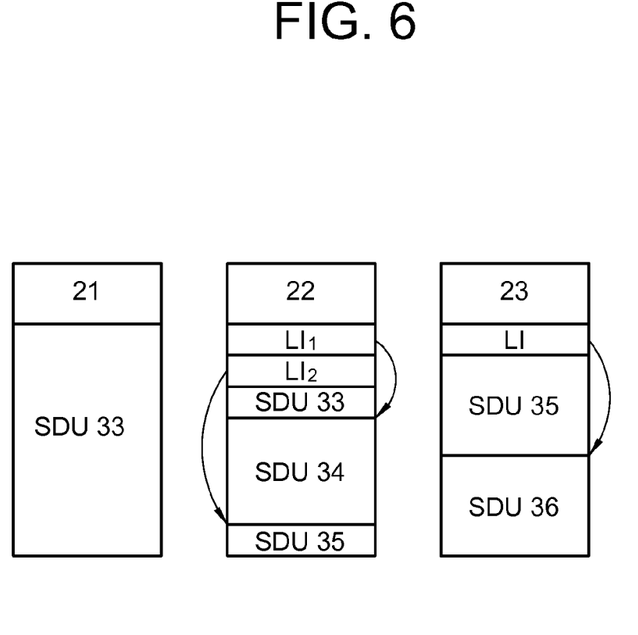
FIG. 6 is a view showing RLC PDUs 21 to 23 among the RLC PDUs of FIG. 5.

FIG. 6 is a view showing RLC PDUs 21 to 23 among the RLC PDUs of FIG. 5.

Referring to FIG. 6, since PDU 21 is configured only with the first segment of SDU 33, there is no boundary of SDUs. Accordingly, PDU 21 does not need an LI and is configured with the SN and a portion of SDU 33.

Since PDU 22 is configured with the final segment of SDU 33, the entire SDU 34, and the first segment of SDU 35, PDU 22 contains two boundaries. Accordingly, PDU 22 includes two LI fields indicating each of the boundaries in the header. LI1 indicates the boundary between SDU 33 and SDU 34, and LI2 indicates the boundary between SDU 34 and SDU 35.

Since PDU 23 is configured with a segment of SDU 35 and a segment of SDU 36, there is one boundary between SDU 35 and SDU 36. Accordingly, PDU 23 includes one LI field indicating the boundary between SDU 35 and SDU 36 in the header.

Figure 7:
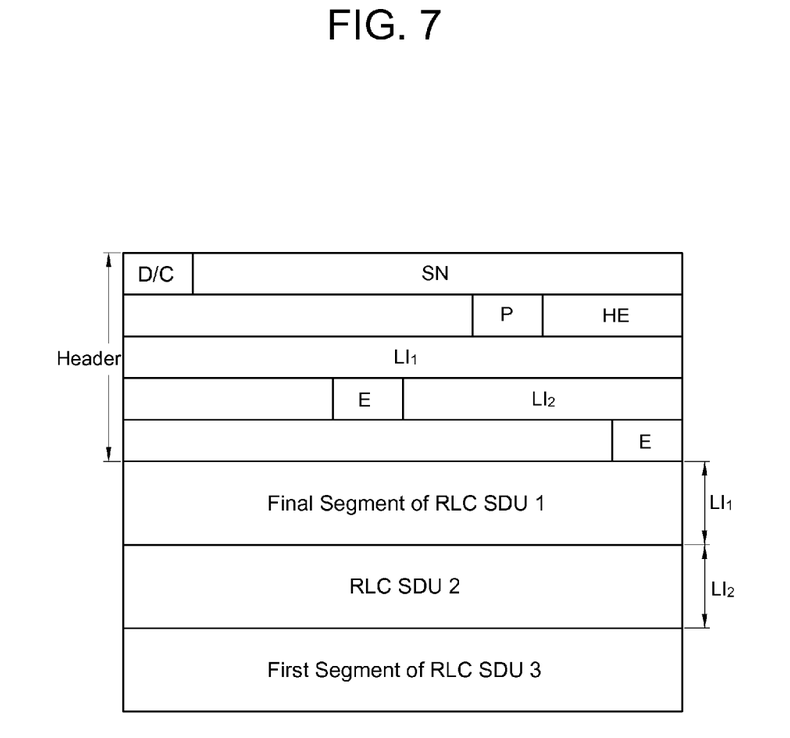
FIG. 7 is a view showing the configuration of a data block according to an embodiment of the present invention.

FIG. 7 is a view showing the configuration of a data block according to an embodiment of the present invention.

Referring to FIG. 7, three upper data blocks comprising two RLC SDU segments and one RLC SDU are included in one RLC PDU (lower data block). One upper data block corresponds to a data field element, and the data field includes three data field elements. The final segment of RLC SDU 1 is included in the first place, the entire portion of RLC SDU 2 is included in the next place, and the first segment of RLC SDU 3 is included in the last place. The size of RLC SDU 3 is so large that only a portion of RLC SDU 3 is included in the RLC PDU.

An LI indicates a boundary between RLC SDUs, and here, two LIs are needed. $LI_1$ indicates the boundary between RLC SDU 1 and RLC SDU 2, and $LI_2$ indicates the boundary between RLC SDU 2 and RLC SDU 3. The value of $LI_1$ is the length from the end of the header to the first boundary of RLC SDUs. That is, $LI_1$ indicates the length from the end of the header to the end of RLC SDU 1 included in the RLC PDU. The value of $LI_2$ is the length from the first boundary of RLC SDUs existing in the RLC PDU to the second boundary of RLC SDUs. $LI_2$ indicates the length from the boundary between RLC SDU 1 and RLC SDU 2 to the boundary between RLC SDU 2 and RLC SDU 3. Here, $LI_1$ and $LI_2$ respectively use 11 bits. One LI portion has an LI of 11 bits and an E field of 1 bit, and the entire LI portion comprises two LI portions, and therefore, the entire LI portion has 24 bits (3 octets).

If it is assumed that the first data field element is a segment of RLC SDU 1 and the second data field element is RLC SDU 2, $LI_1$ indicates the length of the first data field element, and $LI_2$ indicates the length of the second data field element.

Here, although it is described that three RLC SDUs are included in one RLC PDU, the number of RLC SDUs included in the RLC PDU is not restricted. Accordingly, at least two or more RLC SDUs can be included in the RLC PDU, and therefore, the number of LIs included in the header may vary.

The LI does not indicate a distance from the end of the header as a starting point to the end of one RLC SDU, but indicates a distance between boundaries of RLC SDUs. Therefore, transmission efficiency is enhanced by decreasing the size of the header, and limitation on the maximum size of an included RLC SDU can be removed.

A transmitter sets the length from the end of the RLC PDU header to the end of the first RLC SDU included in the RLC PDU as the first LI and includes the first LI into the header of the RLC PDU. Then, if the end of the second RLC SDU is additionally included in the RLC PDU, the transmitter sets the length from the end of the first RLC SDU to the end of the second RLC SDU as the second LI and includes the second LI into the header of the RLC PDU. Here, the end of the second RLC SDU means the boundary between the second RLC SDU and the third RLC SDU.

For the first LI of the RLC PDU, a receiver recognizes that the first LI indicates the length from the end of the header of the RLC PDU to the end of the first RLC SDU included in the first place of the RLC PDU and reproduces the first RLC SDU. Then, for additional LIs included in the RLC PDU, the receiver recognizes that each of the LIs indicates the length from a boundary of RLC SDUs within the RLC PDU, which is indicated by an LI included in the RLC PDU immediately before the LI, to a next boundary of RLC SDUs and reproduces a RLC SDU. Here, a boundary of RLC SDUs means the end of an previous RLC SDU.

In order to optimize the header size of an AMD PDU in a RLC entity operating in the AM mode, the RLC entity calculates a value of a specific field included in the header of the AMD PDU in a different method depending on whether a specific situation is occurred. When calculating a value of a specific field included in the header of the RLC PDU, the RLC entity calculates the value in a different method depending on whether or not a specific situation is occurred. The RLC entity determines a value of information related to the RLC SDU depending on whether a specific situation is occurred and includes the determined value into the header of the RLC PDU.

The specific situation means a case where a RLC SDU included in a RLC PDU is the first RLC SDU included in the RLC PDU when the RLC entity configures the RLC PDU. In another embodiment, the specific situation means a case where the last segment of a RLC SDU included in a RLC PDU is the first RLC SDU included in the RLC PDU when the RLC entity configures the RLC PDU.

If a specific situation is occurred, the RLC entity may calculate the length from the end of the header of the RLC PDU to the end of the RLC SDU as a value of the specific field. If a specific situation is not occurred, the RLC entity may calculate the length from the end of a RLC SDU preceding a RLC SDU newly included in the RLC PDU to the end of the newly included RLC SDU as a value of the specific field. The end of the RLC SDU may be a boundary between RLC SDUs.

The specific field may be included in a RLC PDU where the final segment of the RLC SDU is included. If the specific field is not included in the RLC PDU where the final segment of the RLC SDU is included, the specific field may be included in the next RLC PDU.

The specific field may be used to indicate the length of each of RLC SDUs included in a specific RLC PDU when the RLC entity configures the RLC PDU. Alternatively, the specific field may be used to indicate the length of a RLC SDU included in a specific RLC PDU when the RLC entity configures the RLC PDU. The specific field may be used to indicate the length of a segment of each of RLC SDUs included in a specific RLC PDU when the RLC entity configures the RLC PDU. The specific field may be used to indicate the length of a segment of a RLC SDU included in a specific RLC PDU when the RLC entity configures the RLC PDU. The specific field may be used to indicate a position of a boundary of RLC SDUs included in a specific. RLC PDU when the RLC entity configures the RLC PDU. The specific field may be used to inform information needed when the RLC entity receiving the specific RLC PDU reproduces RLC SDUs from the RLC PDU. The information related to the RLC SDUs means the specific field.

The specific field may be an LI. If the specific situation is occurred, the value of the specific field is set to the length from the end of the header of the RLC PDU to the end of the RLC SDU. If the specific situation is not occurred, the value of the specific field is set to the length from the end of a RLC SDU included immediately before a RLC SDU newly included in the RLC PDU to the end of the RLC SDU newly included in the RLC PDU. Alternatively, if the specific situation is not occurred, the value of the specific field may be set to the size of a RLC SDU newly included in the RLC PDU. If the specific situation is not occurred, the value of the specific field may be set to the distance to a boundary of RLC SDUs included in the RLC PDU.

When the RLC entity includes one or more RLC SDUs into a RLC PDU, an LI related to the RLC SDU is included in the header of the RLC PDU if the final segment of the RLC SDU is included in the RLC PDU. At this point, if the RLC SDU is the first RLC SDU included in the RLC PDU, the LI is set to the length from the end of the header of the RLC PDU to the end of the RLC SDU, i.e., the length to the rear boundary of the RLC SDU. If the RLC SDU is not the first RLC SDU included in the RLC PDU, the LI is set to the length from the boundary of a position indicated by the previous LI included in the RLC PDU to the end of the newly included RLC SDU, i.e., the length to a rear boundary generated by the new RLC SDU. According to this, the LI is set to the length from the last previous boundary of RLC SDUs to the newly generated boundary of RLC SDUs. The LI indicates the size of the newly included RLC SDU.

The N-th LI included in the header of the RLC PDU means the length from the (N−1)-th boundary to the N-th boundary of RLC SDUs included in the RLC PDU. Alternatively, the N-th LI included in the header of the RLC PDU means the size of the N-th RLC SDU among the RLC SDUs included in the RLC PDU. Here, the first LI means the length from the end of the header of the RLC PDU to the first boundary of RLC SDUs included in the RLC PDU. Alternatively, the first LI means the size of the entire or a portion of the first RLC SDU included in the RLC PDU, starting from the end of the header of the RLC PDU.

Figure 8:
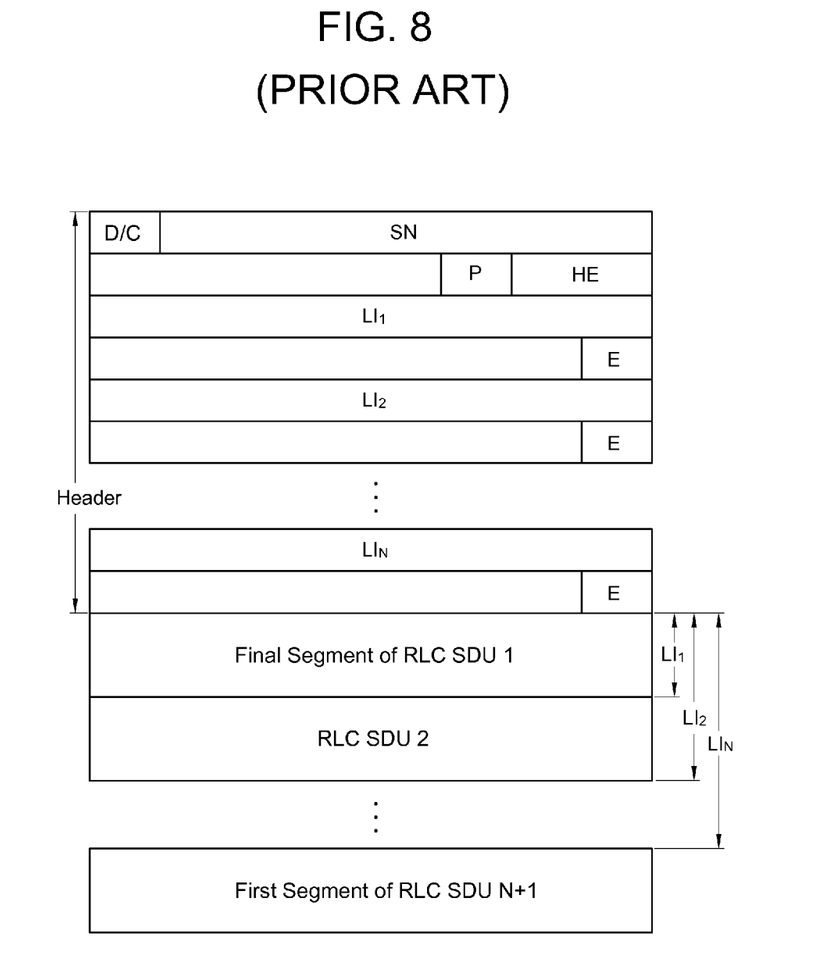
FIG. 8 is a view showing the configuration of a data block according to a conventional art.

FIG. 8 is a view showing the configuration of a data block according to a conventional art.

Referring to FIG. 8, one RLC PDU includes N+1 RLC SDUs. Accordingly, since the RLC PDU has N boundaries, N LIs are needed. This is the case where all LIs are calculated as a distance from the end of the header as a starting point to each of boundary. It is $LI_1$ that indicates the position of the boundary between RLC SDU 1 and RLC SDU 2, it is $LI_2$ that indicates the position of the boundary between RLC SDU 2 and RLC SDU 3, and it is $LI_N$ that indicates the position of the boundary between RLC SDU N and RLC SDU N+1.

The number of bits representing an LI is restricted in a uniform way. For example, if the maximum number of bits for representing an LI is 7 bits, the amount of data that can be included in maximum, i.e., the total sum of RLC SDU sizes, is 128. If the maximum number of bits for representing an LI is 15 bits, the amount of data that can be included in maximum, i.e., the total sum of RLC SDU sizes, is 32,767. According to this, the size of a RLC PDU and the total amount of RLC SDUs loaded onto the RLC PDU are restricted depending on the maximum number of bits representing the LI. That is, since the LI indicates a distance from the end of the header as a starting point to each of boundaries of RLC SDUs, if the distance is larger than 32,767, it cannot be expressed.

The overhead of an LI itself may be a problem. For example, the maximum size of a TCP/IP (Transmission Control Protocol/Internet Protocol) packet practically used in the Internet is about 1,500 bytes. That is, it means that the size of a TCP/IP packet can be sufficiently expressed using only 11 bits. Accordingly, if an LI of 15 bits is used, an overhead of 15 bits is included when one RLC SDU is included in a RLC PDU, and thus transmission efficiency of the RLC may be lowered. If two LIs are needed when an LI of 15 bit and an E field of 1 bit are used, the number of bits needed for the entire LI portion is 32 bits. In comparison to this, according to an embodiment of FIG. 7, the entire LI portion can be expressed using only 24 bits. Therefore, it is shown that about 1.5 times of overheads are decreased.

Therefore, if an LI indicates the length of each RLC SDU, the restriction on the maximum size of a RLC PDU can be removed, and the size of the header also can be decreased.

Figure 9:
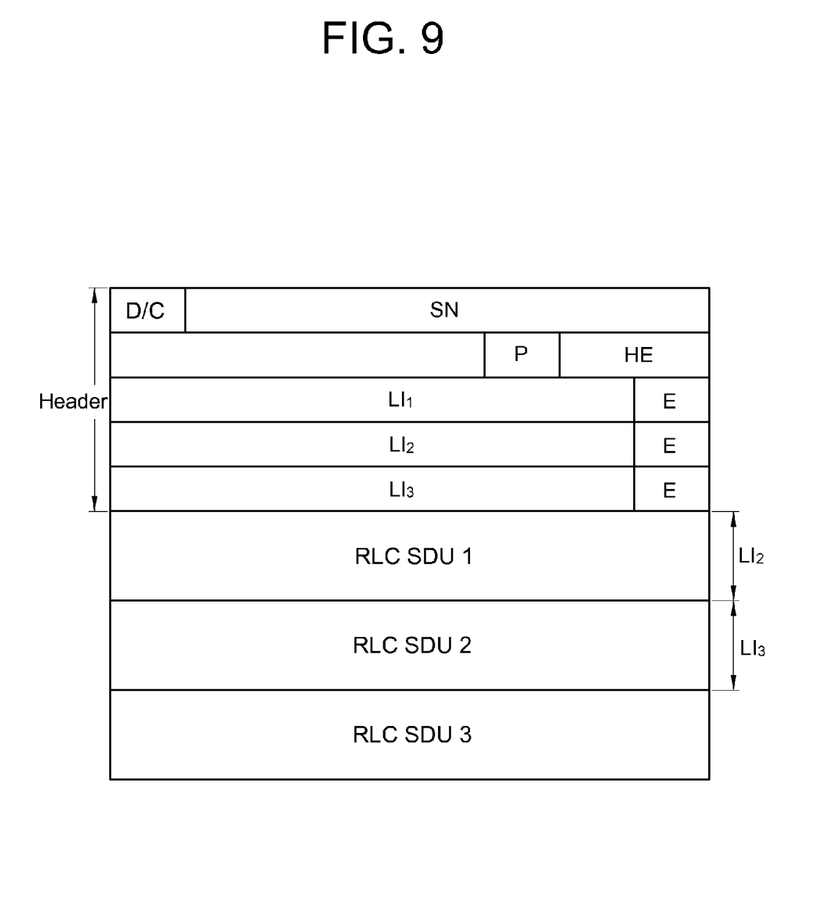
FIG. 9 is a view showing the configuration of a data block according to another embodiment of the present invention.

FIG. 9 is a view showing the configuration of a data block according to another embodiment of the present invention.

Referring to FIG. 9, this is the case where the first LI is used as a special LI. Examples of 7-bit special LIs are shown in Table 1, and examples of 15-bit special LIs are shown in Table 2. For example, it is assumed that '0000000' is used as $LI_1$. A special LI having a value of '0000000' is included in the first portion of a corresponding RLC-PDU. When the final segment of the first RLC SDU included in the RLC PDU in the first place is included in the RLC PDU and $LI_2$ for the first RLC SDU is included in the header of the RLC PDU, the added LI, i.e., the second LI, is set to the length from the end of the header of the RLC PDU to the end of the first RLC SDU, i.e. to the position of the boundary between the first RLC SDU and the second RLC SDU. If a third RLC SDU is included in subsequence to the second RLC SDU, an LI related to the included RLC SDU is set to the length from the previous boundary of RLC SDUs included in the RLC PDU to the new boundary of RLC SDUs generated by the newly included RLC SDU.

Various modifications and variations may occur to those skilled in the art considering special LIs, without being limited to the embodiments described above.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a data block in a wireless communication system, the method comprising:
   selecting a bit length for a length indicator in accordance with an instruction;
   generating a Radio Link Control (RLC) Protocol Data Unit (PDU) comprising a header and a data field, the header comprising M length indicators, where M≥2, the data field comprising M+1 data field elements, and
   transmitting, by a transmitter, the RLC PDU to a receiver,
   wherein m-th length indicator indicates a length in bytes of m-th data field element, where m=1, . . . , M,
   wherein each data field element includes a RLC Service Data Unit (SDU) or a RLC SDU segment,
   wherein each length indicator indicates a length of a RLC SDU or a RLC SDU segment of corresponding data field element,
   wherein m-th length indicator indicates a distance between an end of (m−1)-th data element and a start of (m+1)-th data element, where m=2, . . . , M, and
   wherein the selection of the bit length for each of the M length indicators comprises selecting the bit length from amongst a plurality of bit length values including 11 bits and 15 bits.

2. The method of claim 1, wherein the header further comprises an E (Extension) field which indicates whether the data field follows or a set of E field and length indicator follows.

3. The method of claim 1, wherein the header further comprises a Sequence Number (SN) field which indicates a SN of the RLC PDU.

4. The method of claim 1, wherein the RLC PDU is a RLC data PDU.

5. The method of claim 1, wherein the RLC PDU further includes a special indicator indicating whether at least one RLC SDU in the data field is segmented at the beginning or at the end of the data field.

6. A device of transmitting a data block in a wireless communication system, the device comprising:
   a RF (Radio Frequency) unit for transmitting and receiving radio signals; and
   a processor coupled to the RF unit, having a Radio Link Control (RLC) layer, and configured to:
   select a bit length for a length indicator in accordance with an instruction;
   generate a RLC Protocol Data Unit (PDU) comprising a header and a data field, the header comprising M length indicators, where M≥2, the data field comprising M+1 data field elements, and
   transmit the RLC PDU to a receiver,
   wherein m-th length indicator indicates a length in bytes of m-th data field element, where m=1, . . . , M,
   wherein each data field element includes a RLC Service Data Unit (SDU) or a RLC SDU segment,
   wherein each length indicator indicates a length of a RLC SDU or a RLC SDU segment of corresponding data field element,
   wherein m-th length indicator indicates a distance between an end of (m−1)-th data element and a start of (m+1)-th data element, where m=2, . . . , M, and
   wherein the processor selects the bit length for each of the M length indicators from amongst a plurality of bit length values including 11 bits and 15 bits.

* * * * *